United States Patent
Aumann et al.

(10) Patent No.: US 11,905,632 B2
(45) Date of Patent: Feb. 20, 2024

(54) METHOD FOR PRODUCING A TRIM PART, AND A TRIM PART

(71) Applicant: Bayerische Motoren Werke Aktiengesellschaft, Munich (DE)

(72) Inventors: Thomas Aumann, Buch am Erlbach (DE); Florian Dechant, Adlkofen (DE); Johann Gasslhuber, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/455,572

(22) Filed: Nov. 18, 2021

(65) Prior Publication Data

US 2022/0154373 A1 May 19, 2022

(30) Foreign Application Priority Data

Nov. 19, 2020 (DE) ............. 10 2020 130 598.2

(51) Int. Cl.
*D04B 7/04* (2006.01)
*B32B 5/02* (2006.01)
(Continued)

(52) U.S. Cl.
CPC ............ *D04B 7/04* (2013.01); *B32B 5/026* (2013.01); *B32B 37/10* (2013.01);
(Continued)

(58) Field of Classification Search
CPC ... D04B 7/04; D04B 1/22; D04B 7/30; D10B 2505/12; D10B 2401/041; D10B 2403/0112; D10B 2403/0114; B60R 13/0256; D06N 3/0009; D06N 3/009; D06N 3/042; B32B 5/026; B32B 37/10;
(Continued)

(56) References Cited

U.S. PATENT DOCUMENTS 5,514,458 A * 5/1996 Schulze-Kadelbach ............ B32B 5/026
442/224
5,618,624 A * 4/1997 Dinger ............ D04B 1/04
428/397

(Continued)

FOREIGN PATENT DOCUMENTS

DE 196 36 208 A1 3/1998
DE 10 2006 003 493 A1 8/2007
(Continued)

OTHER PUBLICATIONS

DE10 2017 221 069 A1 Machine Translation of Description (EPO/Google) (Year: 2023).*
(Continued)

*Primary Examiner* — Cynthia L Schaller
(74) *Attorney, Agent, or Firm* — Crowell & Moring LLP

(57) ABSTRACT

A method for producing a trim part includes the following steps: generating a surface covering, wherein a knitted semi-finished product is generated on a flat knitting machine; the knitted semi-finished product is washed; the washed knitted semi-finished product is heat set; and laminating, in particular press-laminating or compression-laminating, the generated surface covering onto a carrier part.

11 Claims, 2 Drawing Sheets

(51) Int. Cl.
  *B32B 38/00* (2006.01)
  *B32B 38/16* (2006.01)
  *B32B 37/10* (2006.01)
  *B32B 37/24* (2006.01)

(52) U.S. Cl.
  CPC ...... *B32B 38/0036* (2013.01); *B32B 38/0004* (2013.01); *B32B 38/162* (2013.01); *B32B 2037/243* (2013.01); *B32B 2305/182* (2013.01); *B32B 2605/08* (2013.01)

(58) Field of Classification Search
  CPC ............ B32B 38/0036; B32B 38/0004; B32B 38/162; B32B 2037/243; B32B 2305/182; B32B 2605/08; B32B 2255/02; B32B 2262/0246; B32B 5/26; B32B 2262/0276; B32B 2307/404; B32B 2307/724; B32B 2605/003; B32B 7/12
  See application file for complete search history.

(56) References Cited

U.S. PATENT DOCUMENTS

| | | | |
|---|---|---|---|
| 6,227,010 B1 | 5/2001 | Roell | |
| 2006/0177620 A1* | 8/2006 | Gray | B60K 37/00 428/57 |
| 2007/0238378 A1* | 10/2007 | Conover | B32B 5/26 442/59 |
| 2019/0351644 A1* | 11/2019 | Delmas | B32B 5/245 |
| 2020/0040502 A1 | 2/2020 | Aumann et al. | |
| 2020/0047453 A1* | 2/2020 | Johnson | B32B 5/08 |

FOREIGN PATENT DOCUMENTS

| | | |
|---|---|---|
| DE | 10 2006 008 231 A1 | 8/2007 |
| DE | 102017221069 A1 * | 5/2019 |
| DE | 10 2018 212 743 A1 | 2/2020 |
| WO | WO 2004/053217 A1 | 6/2004 |

OTHER PUBLICATIONS

Aaron, "Different Types of Knitting Machines: That You Can Use in Your Textile Industry"—Stintelli Xinda Precision Machine published Jul. 3, 2019 (https://www.xdknitmachinery.com/types-of-knitting-machines/). (Year: 2019).*

German-language Search Report issued in German Application No. 10 2020 130 598.2 dated Jul. 2, 2021 with a partial English translation (12 pages).

* cited by examiner

METHOD FOR PRODUCING A TRIM PART, AND A TRIM PART

CROSS REFERENCE TO RELATED APPLICATION

This application claims priority under 35 U.S.C. § 119 from German Patent Application No. DE 10 2020 130 598.2, filed Nov. 19, 2020, the entire disclosure of which is herein expressly incorporated by reference.

BACKGROUND AND SUMMARY OF THE INVENTION

The present invention relates to a method for producing a trim part, and to a trim part so produced.

In the construction of automobiles nowadays surfaces in the vehicle interior, or in the passenger cabin of motor vehicles, respectively, are provided with decors in order to generate an appealing visual impression for vehicle occupants. There are a multiplicity of surface variants (leather, artificial leather, films, textiles) for the interior equipment components or trim parts, respectively, the surface variants being applied to a carrier by way of various laminating methods. A warp-knitted and/or weft-knitted spacer fabric, a foam backing or a non-woven material is currently used as a tactile layer for laminated interior equipment components, for example. It has become customary here for decors, for example in the form of films with the visual impact of wood or carbon, to be adhesively bonded to a plastics material carrier. It is moreover also known for skins of leather or artificial leather to be mounted on carrier structures with the aid of laminating methods, for example a press-laminating method or similar laminating methods, without a fixed upper tool, for example, so as to generate a visual impact of leather. In this laminating procedure the films or the skins are connected to the underlying carrier structure in a materially integral manner with the aid of an adhesive. The heat for activating the adhesive is introduced through the skin into the adhesive joint by a warm press die of the press-laminating tool by way of contact heat or by means of IR radiation. As a result, the adhesive is activated during the laminating method and connects the film or the skin, respectively, to the carrier structure.

However, by virtue of the materials used and by virtue of the production methods used, many of these surfaces are restricted in terms of the application potential of the trim parts in the vehicle interior.

Proceeding from this prior art, the present invention is based on the object of providing a trim part as well as a production method for a trim part, the trim part being able to be used in many different specific applications.

This object is achieved by a method and by a trim part according to the independent claims. Further embodiments are set forth in the dependent claims relating thereto.

In order for this object to be achieved, the invention provides a method for producing a trim part, the method comprising the following steps of generating a surface covering and laminating the generated surface covering onto a carrier part. In order for the surface covering to be generated, a knitted semi-finished product is first made on a flat-bed knitting machine. The knitted semi-finished product thereafter is washed and subsequently heat set. The knitted semi-finished product during heat-setting is set on both sides and run through a conveyor oven. The knitted semi-finished product is set in the oven, wherein the knitted semi-finished product as a result of the input energy shrinks to the desired nominal dimensions. Applied and added auxiliary materials are secured and impart to the knitted semi-finished product the desired final characteristics.

The trim part is preferably an interior component for the vehicle interior of a vehicle. The trim part can however also be used for other transport means such as aircraft, ships, trains, etc. Utilizing the trim part in items of furniture or interior furnishing objects is also contemplated.

The use of knitted textiles, for example as a knitted semi-finished product, in trim parts for motor vehicles opens up a multiplicity of new possibilities both in terms of the production process of the trim parts as well as in terms of the function of these components.

Furthermore, after washing the knitted semi-finished product, the knitted semi-finished product can be dried.

After washing the knitted semi-finished product, a coating/waterproofing or a finishing agent can optionally be applied to the knitted semi-finished product. In the finishing line here an acrylate can be sprayed on after washing and prior to drying, this leading to a solidification of the yarn, or the filaments in the yarn, respectively, as a result of which the knitted semi-finished fabric becomes more resilient. Additionally or alternatively, functional characteristics such as, for example, water-repellent or dirt-repellent finishes (for example fluorocarbon agents), which are sprayed on prior to the drying process or are applied to the yarn in an immersion bath, can also be applied to the yarns. The self-cleaning characteristics of the knitted semi-finished product can be improved as a result. Furthermore, coatings having fluorescent characteristics can be applied. Further functional characteristics can likewise be represented.

In a further step, the heat-set knitted semi-finished product is cut to size prior to laminating. The external shape of the knitted semi-finished product can thus be pre-tailored and thus adapted to the shape of the carrier part. The tailoring of the blank is preferably performed by means of a laser.

In a first embodiment of the method, the knitted semi-finished product is configured as a two-dimensional broadcloth.

In a second embodiment of the method, a three-dimensional part can be formed as the knitted semi-finished product. When producing a 3D knitted fabric, the covering can be knitted so as to be comparatively accurate in terms of the edges or the blank, respectively. Subsequent cutting from the broadcloth is no longer required. Offcuts of material which have to be disposed of as waste, such as when cutting the blanks from the broadcloth, are dispensed with. A waste-free production is created. Furthermore, geometric contours can be conjointly knitted when 3D knitting. A covering which follows the shape and matches the carrier part without stretching or little stretching can thus be generated. In the case of 2D-knitted blanks, the three-dimensional variation has to be generated by stretching and compressing the blank. 3D knitting furthermore offers far more design possibilities in terms of potential changes in yarns, changes in knitting patterns, and surface design possibilities, etc.

In both methods mentioned, the knitted semi-finished product can be generated on a flat-bed knitting machine having two or more needle beds, wherein at least one thread is used for each needle bed. This offers the advantage that multi-colored knitted semi-finished products can be made by using a plurality of threats. Bottom threads which in a normal, or non-tensioned, respectively, state of the knitted semi-finished product are not visible to an observer can here be made visible by stretching the textile such that the coloration of the bottom threads becomes visible. As a result, geometric variations in the shape of the trim part such as arise, for example, in moldings, edges or in the case of integrated functions such as switches, buttons, air vents, etc., can be reinforced in terms of the visual impression thereof.

In both embodiments of the method the knitted semi-finished product can be configured in multiple tiers. A two-tier knitting method can be established as a result. This offers the advantage of differentiating the textile characteristics of the surface covering, for example of a front side and rear side of the surface covering. Alternatively, the knitting pattern of the knitted fabric can be varied such that the color of the bottom threads is only visible when looking normally, thus perpendicularly, onto the textile while only the color of the upper side is visible in the case of an oblique viewing direction.

The knitted semi-finished product can furthermore have a first tier that forms the visible side of the surface covering, and a second tier that lies opposite the visible side, wherein the first tier is configured with wider loops and the second tier is configured with tighter loops. The configuration of the second tier with tighter loops offers the advantage that a rear side of the surface covering is more densely knitted and thus has sufficient tightness in relation to the adhesive by way of which the surface covering is adhesively bonded to the underlying carrier part. The embodiment of the second tier with tighter loops furthermore offers the advantage that the surface covering is non-transparent in terms of the underlying carrier part. The color of the carrier part can thus not shine through the surface covering, which could be considered irritating by a vehicle occupant. In other words, the first tier configures a front side and the second tier configures a rear side of the surface covering.

By using a first yarn for the first tier of the knitted semi-finished product and a second yarn for the second tier of the knitted semi-finished product, a knitted semi-finished product having different characteristics in terms of the front side and the rear side thereof can furthermore be generated. It is particularly advantageous for the front side to be knitted in a variable manner using a high loop with open pores because the softness of the surface covering and thus of the trim part which is required in order to achieve sufficient protection of occupants, for example in the case of a head impact in the event of a crash, is achieved as a result. This knitted first tier with wide loops, which ensures the resilience of the trim part, can be used as a replacement or as an addition to tactile layers. Such tactile layers, for example as warp-knitted/weft-knitted spacer fabrics or as foam material, can be disposed between the surface covering and the underlying carrier part.

Of course, there is also the possibility of laminating a soft layer (non-woven material, warp-knitted/weft-knitted spacer fabric, foam tier, etc.) that improves the tactile characteristics on the rear side of the knitted fabric as is usually known in the case of leather, artificial leather or foam films. This also results in the possibility of embodying the cover layer with fine loops (freedom of design).

The front side, that is to say the first tier of the surface covering, can furthermore have portions which differ from one another as a result of different knitting patterns of the yarn and/or as a result of the use of different yarns. Surface regions which differ in terms of the mechanical characteristics thereof can thus be generated on the trim part. Trim parts which in the transition region to the door mirror, to the armrests, to the dashboard support, have correspondingly adapted characteristics can thus be generated. The variability in terms of making the covering is increased as a result of the possibility of a consciously positioned change of the knitting pattern in the surface covering. As a result, smooth regions which are more resistant to abrasion can be implemented in the armrests region, for example.

The knitted semi-finished product is preferably designed so as to be permeable to air and radiation. This offers the advantage that the adhesive which is disposed between the surface covering and the carrier part when adhesively bonding or laminating onto the carrier part can be activated in an optimal manner. As has already been mentioned, it is advantageous for at least a second tier, that is to say the tier of the surface covering that faces the carrier part, is impermeable to the adhesive. In a further aspect, the invention relates to a trim part for a vehicle, having a surface covering which comprises a knitted semi-finished product, and a carrier part, wherein the surface covering is laminated onto the carrier part. Subsequent cooling of the adhesive in the joint can also be implemented as a result of the permeable knitted fabric pattern of the knitted semi-finished product.

Furthermore, a coating can be applied to the knitted semi-finished product of the surface covering.

In a first alternative, the knitted semi-finished product can be configured as a two-dimensional broadcloth. In a second alternative, the knitted semi-finished product can be configured as a three-dimensional covering.

The surface covering can furthermore be configured as a knitted semi-finished product configured with multiple tiers, or comprise a knitted semi-finished product configured with multiple tiers, respectively.

The knitted semi-finished product can have a first tier that forms the visible side of the surface covering, and a second tier that lies opposite the visible side, wherein the first tier is configured with wider loops and the second tier is configured with tighter loops.

Alternatively thereto, the first tier can be configured with tighter loops than the second tier.

The first tier in at least one region can be configured with a first type of knitting pattern or a first yarn, and in at least one second region configured with a second type of knitting pattern or a second knitting pattern yarn.

The invention offers the advantage that the representation of lines, symbols, patterns, contours is able to be implemented by way of multi-colored knitted fabrics. The abrasion resistance of the trim part can be implemented by stress-optimized materials or yarn characteristics, respectively, and/or by stress-optimized yarn-connecting methods. Acrylate or fusible yarns, for example, are particularly suitable as stress-optimized yarn solidification materials. In order to enhance the sustainability of the trim part, recycled polyester yarns which are harvested from recycled polyethylene bottles, for example, can be used.

An insensitivity to dust can furthermore be implemented by the characteristics of the knitted pattern structure. Dust in the vehicle is rapidly visible on smooth leather films, artificial leather films and foam films. In contrast, the relatively coarse knitted fabric pattern is entirely insensitive. Dust is not visible but can be readily vacuumed.

The invention furthermore offers the advantage that the tactile characteristics of the trim part and the tactile characteristics of the surface covering can be differently configured in the individual regions without seams being provided between the regions, as the seams can be integrated in the knitting process when producing the knitted semi-finished product. An airbag weakening can be achieved by weakening the knitted semi-finished product, for example by means of a laser, wherein this airbag weakening cannot be identified on the visible surface of the trim part.

Other objects, advantages and novel features of the present invention will become apparent from the following detailed description of one or more preferred embodiments when considered in conjunction with the accompanying drawings.

DETAILED DESCRIPTION OF THE DRAWINGS

According to a first embodiment of the method, a two-dimensional broadcloth is first knitted on a flat-bed knitting machine having two needle beds. Once the broadcloth has been retrieved from the flat-bed knitting machine and, optionally, been rolled up, the broadcloth is washed in the subsequent step. Thereafter, a coating or waterproofing can be applied to the broadcloth. After applying the coating, the two-dimensional broadcloth is heat set. These steps from washing to heat-setting are in most instances performed in a linked continuous plant and are referred to as "finishing", for example. After heat-setting, the two-dimensional broadcloth is cut to size by means of a laser so as to obtain a desired tailoring of the blank. A blank produced by cutting tables or punching tables, etc., may also be possible. The two-dimensional material is subsequently laminated onto the carrier part. As a final product, a trim part is created in particular for vehicles, for creatively trimming the vehicle interior, for example a dashboard, a door trim, a center armrest, etc.

Figure 2:
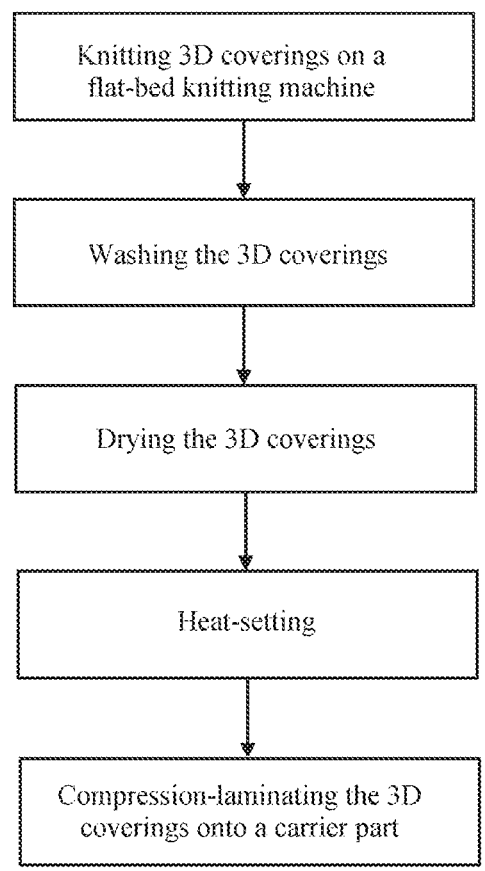
FIG. 2 shows a customary process sequence for producing a trim part according to a second embodiment of the method.

A second alternative of the method is illustrated in FIG. 2. In this variant of the method, the knitted semi-finished product is generated as a three-dimensional knitted fabric, or a three-dimensional covering, respectively, on a flat-bed knitting machine having two or more needle beds. Washing of the three-dimensional covering likewise takes place upon de-molding the three-dimensional knitted semi-finished product, or the covering, respectively. The drying of the coverings takes place after the washing of the three-dimensional coverings. Upon drying the coverings, the three-dimensional coverings are heat set. The three-dimensionally knitted coverings are subsequently laminated onto the carrier part, for example by means of compression-laminating. As the final product of the method, a trim part for creatively trimming the passenger interior, for example a dashboard, a door trim, etc. also is obtained here. In one variant of the method the covering is not generated as an entity. Instead, individual parts of a covering are generated, wherein the individual parts are assembled so as to form one covering.

The entire covering can be a single knitted individual part, or be composed of a plurality of individual parts which are laminated onto the carrier part.

Figure 1:
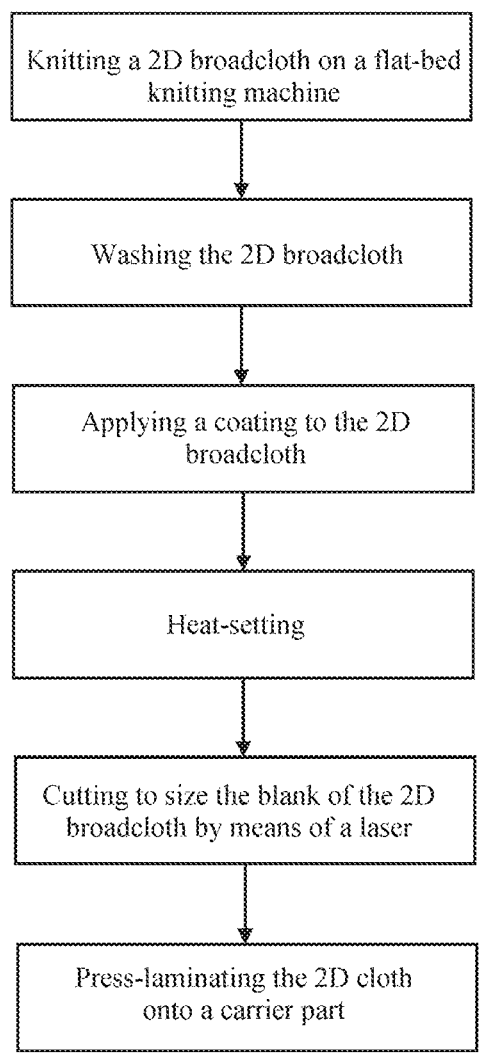
FIG. 1 shows the process sequence for producing a trim part according to a first embodiment of the method.
Figure 3:
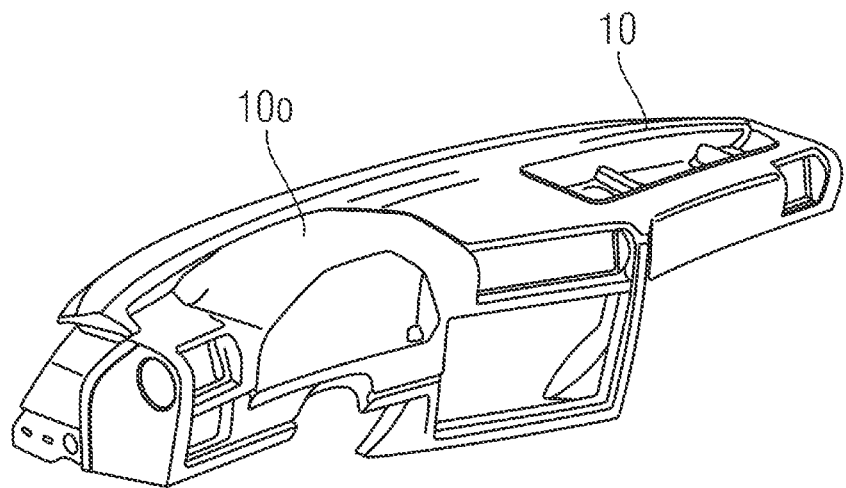
FIG. 3 is a perspective view of an exemplary carrier part.

FIG. 3 in an exemplary manner shows a dashboard support 10 which is to serve as a carrier part 10 for explaining the method. As an alternative to the dashboard support illustrated, all of the trim parts situated in the interior, such as glove boxes, center armrests, center consoles, visors, armrests in the door trims, door trims, roof liners, rear consoles, pillar trims, etc. can also serve as the carrier structure 10. This dashboard support 10 has a surface 10o which is to be laminated with the aid of the surface covering 13. This surface 10o, as illustrated in FIG. 1, can relate to only one portion such as, for example, the upper surface of the binnacle of the so-called combination instrument. The surface 10o to be laminated can however also be that part of the surface of the carrier part 10 that would be visible by a vehicle occupant in the interior of the vehicle. Furthermore alternatively, the surface 10o can also comprise the entire surface of the carrier part 10, wherein in this instance regions of the support part 10 that are not visible to a vehicle occupant would also be laminated.

Figure 4:
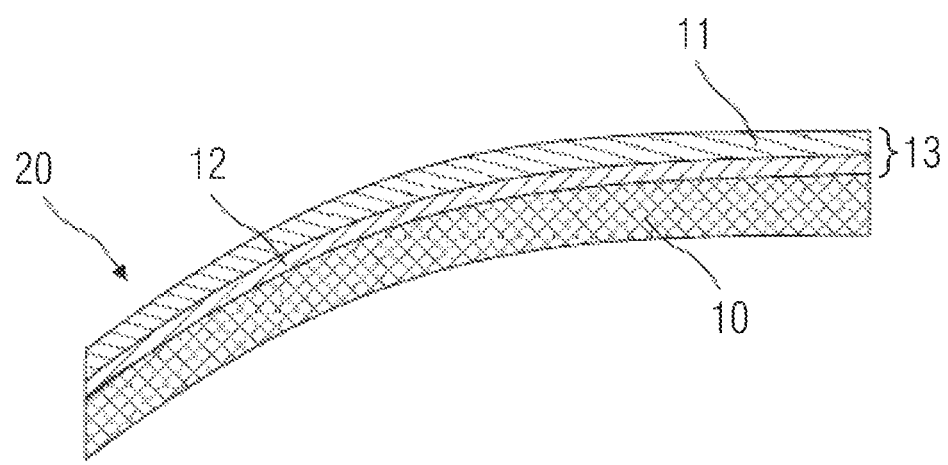
FIG. 4 is an exemplary sectional view through a trim part.

FIG. 4 shows a cross section through a trim part 20 for a vehicle interior of a vehicle not illustrated in more detail. The trim part 20 comprises a carrier part 10 onto which a surface covering 13 is laminated. An adhesive, not illustrated in more detail, can be provided between the surface covering 13 and the carrier part 10. The surface covering 13 comprises a first tier 11 which forms the visible surface of the trim part 20. The surface covering 13 moreover has a second tier 12 which is disposed on a side that faces away from the visible side of the surface covering. In other words, the second tier 12 is situated between the first tier 11 of the knitted semi-finished product 13 and the carrier part 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a trim part, the method comprising:
   generating a surface covering, wherein
      a knitted semi-finished product is generated on a flat-bed knitting machine, wherein the knitted semi-finished product is permeable to air;
      the knitted semi-finished product is washed;
      the washed knitted semi-finished product is heat set and remains permeable to air; and
   laminating the generated surface covering onto a carrier part while the washed knitted semi-finished product remains permeable to air.

2. The method according to claim 1, wherein
   after washing the knitted semi-finished product, the knitted semi-finished product is dried.

3. The method according to claim 1, wherein
   after washing the knitted semi-finished product, a coating is applied to the knitted semi-finished product.

4. The method according to claim 1, wherein
   the heat-set knitted semi-finished product is cut to size prior to laminating.

5. The method according to claim 1, wherein
   the knitted semi-finished product is configured as a two-dimensional broadcloth or as a three-dimensional part.

6. The method according to claim 1, wherein
   the flat-bed knitting machine has at least two needle beds, and at least one thread is used for each needle bed.

7. The method according to claim 1, wherein
   the knitted semi-finished product is configured in multiple tiers.

8. The method according to claim 7, wherein
   the knitted semi-finished product has a first tier that forms a visible side of the surface covering, and a second tier that lies opposite the visible side, and
   the first tier is configured with wider loops and the second tier is configured with tighter loops.

9. The method according to claim 7, wherein
the first tier has at least one region having a first knitting pattern, and at least one second region having a second knitting pattern.

10. The method according to claim 1, wherein
the laminating is carried out by press-laminating or compression-laminating.

11. A method for producing a trim part, the method comprising:
generating a surface covering, wherein
a knitted semi-finished product is generated on a flat-bed knitting machine;
the knitted semi-finished product is washed;
the washed knitted semi-finished product is heat set; and
laminating the generated surface covering onto a carrier part, wherein
the knitted semi-finished product has a first tier that forms a visible side of the surface covering, and a second tier that lies opposite the visible side, and
the first tier is configured with wider loops and the second tier is configured with tighter loops.

* * * * *